United States Patent
Lai et al.

(10) Patent No.: US 8,942,328 B2
(45) Date of Patent: Jan. 27, 2015

(54) TIMING RECOVERY APPARATUS AND METHOD

(71) Applicant: MStar Semiconductor, Inc., Hsinchu Hsien (TW)

(72) Inventors: Ko-Yin Lai, Hsinchu County (TW); Chun-Chi Su, Hsinchu County (TW); Chih-Cheng Kuo, Hsinchu County (TW); Chia-Sheng Peng, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 0 days.

(21) Appl. No.: 14/132,372

(22) Filed: Dec. 18, 2013

(65) Prior Publication Data
US 2014/0177758 A1    Jun. 26, 2014

(30) Foreign Application Priority Data
Dec. 26, 2012 (TW) .............................. 101150170 A

(51) Int. Cl.
| | | |
|---|---|---|
| H04L 27/08 | (2006.01) | |
| H04L 7/00 | (2006.01) | |
| H04L 1/00 | (2006.01) | |
| H04L 7/027 | (2006.01) | |

(52) U.S. Cl.
CPC ............ *H04L 7/0016* (2013.01); *H04L 1/0036* (2013.01); *H04L 7/0278* (2013.01)
USPC .......................................... 375/345; 375/354

(58) Field of Classification Search
CPC ...................... G01R 31/3191; G01R 31/31937; H03M 1/10; H03M 1/1009; H04J 3/0682; H04L 1/0036; H04L 7/0016
USPC .......... 375/340, 346, 354, 326, 316; 455/130, 455/230, 232.2, 234.1, 245.1
See application file for complete search history.

(56) References Cited

U.S. PATENT DOCUMENTS

| | | | | |
|---|---|---|---|---|
| 5,872,815 | A * | 2/1999 | Strolle et al. .................. | 375/321 |
| 6,590,872 | B1 * | 7/2003 | Shiue et al. .................... | 370/314 |
| 7,012,983 | B2 | 3/2006 | Buchwald et al. | |
| 2002/0001043 | A1 | 1/2002 | Lee | |
| 2009/0003504 | A1 * | 1/2009 | Little et al. .................... | 375/376 |

OTHER PUBLICATIONS

Taiwan Intellectual Property Office, "Office Action", Aug. 12, 2014.

* cited by examiner

*Primary Examiner* — Vineeta Panwalkar
(74) *Attorney, Agent, or Firm* — WPAT, PC; Justin King

(57) ABSTRACT

A timing recovery apparatus for compensating a sampling frequency offset of an input signal is provided. The timing recovery apparatus includes a timing error corrector configured to generate an output signal according to the input signal and a calibration signal, a gain controller configured to adjust at least one of a signal edge low-frequency error component and a signal edge high-frequency error component of the output signal and accordingly generate an adjusted signal, a timing error detector configured to generate an error signal according to the adjusted signal, and a calibration signal generator coupled to the timing error detector and the timing error corrector, for generating the calibration signal according to the error signal and outputting the calibration signal to the timing error corrector to compensate the sampling frequency offset of the input signal.

20 Claims, 8 Drawing Sheets

TIMING RECOVERY APPARATUS AND METHOD

This application claims the benefit of Taiwan application Serial No. 101150170, filed Dec. 26, 2012, the subject matter of which is incorporated herein by reference.

BACKGROUND OF THE INVENTION

1. Field of the Invention

The invention relates in general to a timing recovery apparatus and an associated method, and more particularly, to a timing recovery apparatus and an associated method to recover timing by gain adjustment.

2. Description of the Related Art

In a communication system, a sampling frequency offset (SFO) is generated at a receiver when sampling rates are mismatched between a transmitter and a receiver. Errors in sampling points will be caused if the sampling frequency offset is left uncompensated. Further, the error may continue to accumulate over time and lead to a severe effect on system performance. Thus, a typical communication system is provided with a timing recovery apparatus for compensating the sampling frequency offset. The timing recovery apparatus may have a data-aided design or a non-data-aided design (otherwise referred to as a blind design). The data-aid design synchronizes the timing of a transmitter and a receiver by utilizing a known pilot signal or training sequence. The synchronization speed established on such design is fast yet occupies additional transmission bandwidth. In contrast, as the non-data-aided design is capable of synchronizing the timing of the transmitter and the receiver without involving the pilot signal or training sequence, no additional transmission bandwidth is consumed. However, this requires a longer period to achieve synchronization. Thus, a system that demands higher standards for synchronization time (e.g., a wireless local area network (WLAN) communication system) usually establishes synchronization by the data-aided design; a system that demands lower standards for synchronization time (e.g., a radio broadcast communication system) usually establishes synchronization by a non-data-aided design.

The timing recovery technology may be further improved although it has been available for a considerable period of time. With the prevalence of mobile devices, frequent relative movements are present between a transmitter and a receiver. The relative movements cause changes in transmission paths and distances to generate a shift in the frequency of a signal received by the receiver. Such occurrence is referred to a Doppler effect, which becomes more noticeable as the speed of the relative movements becomes faster. At this point, the conventional timing recovery technology is insufficient for maintaining stable sampling points, such that a bit error rate or packet error rate of the communications system rises.

SUMMARY OF THE INVENTION

An object of the present invention is to provide a timing recovery apparatus and associated method for solving issues of the prior art.

Another object of the present invention is to provide a timing recovery apparatus and associated method for timing recovery through gain adjustment.

The present invention discloses a timing recovery apparatus configured to compensate a sampling frequency offset of an input signal. The timing recovery apparatus includes: a timing error corrector, configured to generate an output signal according to the input signal and a calibration signal; a gain controller, configured to adjust at least one of a signal edge low-frequency error component and a signal edge high-frequency error component of the output signal, and accordingly generate an adjusted signal; a timing error detector, configured to generate an error signal according to the adjusted signal; and a calibration signal generator, coupled to the timing error detector and the timing error corrector, for generating the calibration signal according to the error signal, and outputting the calibration signal to the timing error corrector to compensate the sampling frequency offset of the input signal.

The present invention discloses a timing recovery method for compensating a sampling frequency offset of an input signal. The timing recovery method, performed by a timing recovery apparatus, includes: generating an output signal according to a calibration signal and the input signal, wherein the output signal includes a signal edge low-frequency error component and a signal edge high-frequency error component; adjusting at least one of the signal edge low-frequency error component and the signal edge high-frequency error component to accordingly output an adjusted signal; generating an error signal according to the adjusted signal; and generating the calibration signal according to the error signal, wherein the calibration signal is for compensating the sampling frequency offset.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
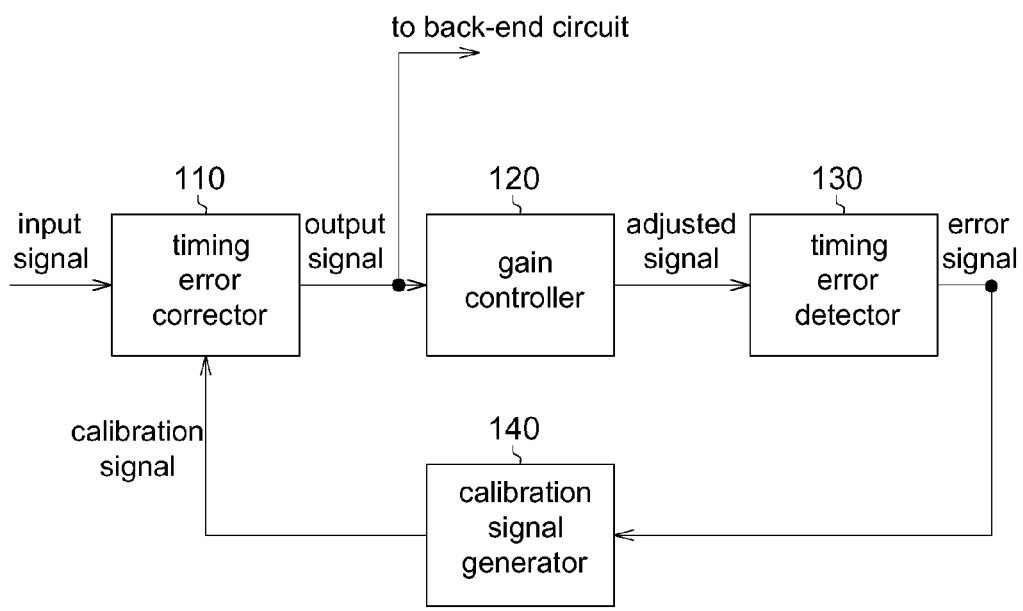
FIG. 1 is a schematic diagram of a timing recovery apparatus according to an embodiment of the present invention.

Technical terms of the application are based on general definition in the technical field of the application. If the application describes or explains one or more terms, definition of the terms are based on the description or explanation within the application. In possible implementation, the relationship between objects or events includes a direct relationship or an indirect relationship, in the application. The indirect relationship refers to that there are intermediate objects or space between the objects or there are intermediate events or timing period between the events. The disclosure below is associated with a timing recovery apparatus and associated method, and details of techniques or principles of the prior art, if not pertaining to technical features of the present invention, are omitted herein. Further, shapes, sizes and ratios of the objects are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and his/her own need. Implementation of the application is flexible.

A timing recovery apparatus and associated method are disclosed by the present invention. The timing recovery apparatus and associated method are applicable to a communication system, e.g., a demodulator compliant to the Advanced Television Systems Committee (ATSC) specification. The above example is for explaining the present invention to a person having ordinary skill in the art, not limiting the present invention. In other words, a person having ordinary skill in the art may apply the present invention to other systems or apparatuses according to the disclosure of the present invention, e.g., to a Digital Video Broadcasting (DVB) system. In possible implementation, a person having ordinary skill in the art may choose equivalent elements or steps for realizing the present invention according to the details of the disclosure. That is, the embodiments are not limited to the embodiments disclosed in the specification. Further, as a part or all of the elements are individually known elements, without affecting the full disclosure and possible implementation of the signal coupling circuit, details associated with the individual elements for realizing the signal coupling circuit are omitted. The timing recovery method of the present invention may be implemented by the timing recovery apparatus of the present invention, or another signal coupling recovery apparatuses. Similarly, without affecting the full disclosure and possible implementation of the method, details associated with hardware for performing the method are omitted.

FIG. 1 shows a schematic diagram of a timing recovery apparatus according to an embodiment of the present invention. Referring to FIG. 1, a timing recovery apparatus 100 according to the embodiment includes a timing error corrector 110, a gain controller 120, a timing error detector 130, and a calibration signal generator 140. The timing error corrector 110 generates an output signal according to a calibration signal and an input signal. For example, the input signal may be an input signal generated from an in-phase baseband signal or a quadrature-phase baseband signal. In the embodiment, the timing error corrector 110 includes an interpolation circuit, which selectively interpolates a plurality of sample values of the input signal to generate the output signal according to the calibration signal. The gain controller 120, coupled to the timing error corrector 110, adjusts at least one of a signal edge low-frequency error component and a signal edge high-frequency error component of the output signal to accordingly output an adjusted signal. In the embodiment, the gain controller 120 is a digital auto-gain controller (DAGC) capable of adjusting a power level of the signal edge low-frequency error component and/or the signal edge high-frequency error component, so that the power level of the low-frequency and/or high-frequency error component(s) equals one of a plurality of predetermined power levels, in a way that the power levels of the two error components are the same or have a fixed ratio. An adjusted signal containing the two error components is then outputted by the gain controller 120. The timing error detector 130, coupled to the gain controller 120, generates an error signal according to the adjusted signal. In the embodiment, the timing error detector 130 adopts a Gardner algorithm for calculating the adjusted signal to generate the error signal. The error calculation using the Gardner algorithm may be represented by an equation: $e_n=(r_n-r_{n-2}) \cdot r_{n-1}$, where n represent an $n^{th}$ time point, $e_n$ represents an error, and $r_n$, $r_{n-1}$ and $r_{n-2}$ represent reception signals at different time points, with $r_n$ and $r_{n-2}$ spaced by a signal period T, and $r_n$ and $r_{n-1}$ spaced by ½ signal period T/2. As the Gardner algorithm is extensively applied in the technical field and known to a person having ordinary skill in the art, further theoretical deductions are omitted herein. The calibration signal generator 140, coupled to the timing error detector 130 and the timing error corrector 110, generates a calibration signal according to the error signal, and outputs the calibration signal to the timing error corrector 110 to compensate the sampling frequency offset of the input signal. In the embodiment, the calibration signal generator 140 is a filter capable of generating the calibration signal by processing the error signal according to a predetermined rule. For example, without affecting possible implementation of the present invention, the predetermined rule is an averaging calculation, a weighted averaging calculation or another known calculation on the error signal received within a period of time.

It should be noted that, illustrations or examples of the timing error corrector 110, the gain controller 120, the timing error detector 130 and the calibration signal generator 140 are for a person having ordinary skill in the art to understand the present invention, not to limit the present invention. In other words, a person having ordinary skill in the art may realize the above elements by other techniques or different settings. For example, the timing error corrector 110 may included a phase generation and selection circuit as a replacement of the foregoing interpolation circuit. The phase generation and selection circuit may generate a plurality of sampling phases, and sample the input signal by selecting an appropriate sampling phase according to the calibration signal to generate the output signal. For example, the gain controller 120 may adopt a greater number of predetermined power levels to increase a resolution or a smaller number of predetermined power levels for cost reduction. For example, the timing error detector 130 may adopt other algorithms suitable for the present invention, e.g., a Mueller & Muller detector, an early-late time error detector, or a zero crossing detector for generating the error signal. For example, the calibration signal generator 140 may be other operational circuits apart from a filter. It should be noted that the timing error corrector 110, the gain controller 120, the timing error detector 130 and the calibration signal generator 140 are known prior art. Thus, the present invention is focused on the technical features of the present invention instead of details of the known prior art. It should also be noted that, in addition to serving a subsequent timing error calibration procedure, the output signal calibrated by the timing error corrector 110 may also be an input for a back-end circuit (e.g., an equalizer or a data processor). Operational details of such back-end circuits are prior art unrelated to the technical features of the present invention, and shall be omitted herein, given that the full disclosure and possible implementation of the present invention are unaffected.

In the embodiment, the gain controller 120 adjusts the signal edge low-frequency error component and the signal edge high-frequency error component, so as to prevent changes in the power levels of the two error components from causing a change in the error signal generated by the timing error detector 130. More specifically, by adjusting the two error components, the error signal generated by the timing error detector 130 becomes less sensitive to changes in the transmission environment and remain relatively stable, in a way that the subsequent timing calibration and the system performance can be kept stable as well.

Figure 2:
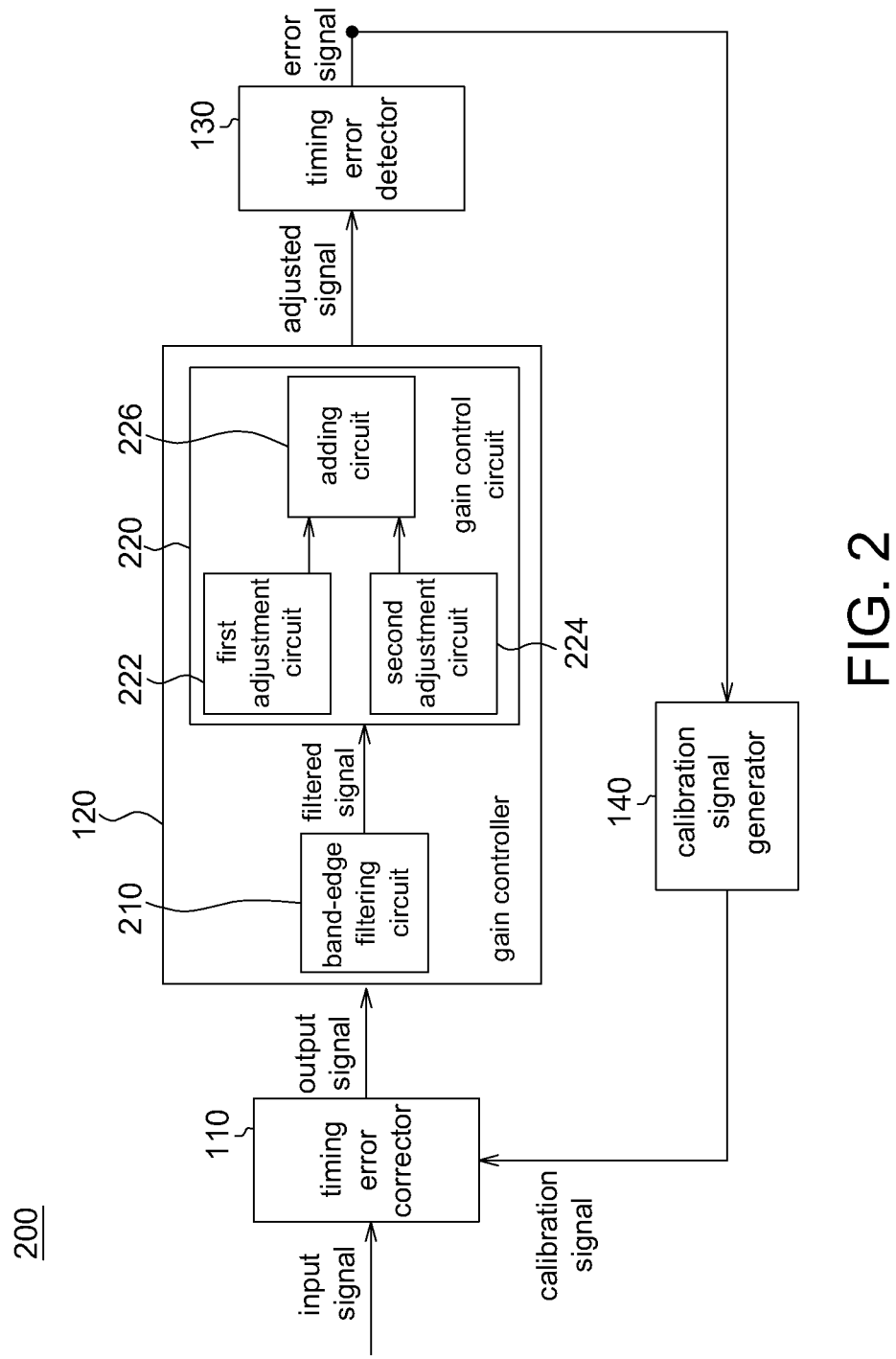
FIG. 2 is a schematic diagram of a gain controller in FIG. 1 according to an embodiment of the present invention.

FIG. 2 shows a schematic diagram of the gain controller 120 in FIG. 1 according to an embodiment of the present invention. In the embodiment, the gain controller 120 includes a band-edge filtering circuit 210 and a gain control circuit 220. The band-edge filtering circuit 210 samples the signal edge lower-frequency error component and the signal edge high-frequency error component according to the output signal to generate a filtered signal. The band-edge filtering circuit 210 further provides the filtered signal which includes the two error components to the gain control circuit 220 for adjustment, so as to assist the timing error detector 130 in performing error detection. It should be noted that, the two error components, which may have different power levels due to factors of transmission channels or other factors, may affect the detection accuracy of the timing error detector 130. Hence, by filtering out the two error components using the band-edge filtering circuit 210, interference from other signal components can be reduced to assist the timing recovery apparatus 200 in more accurately detecting errors. The gain control circuit 220 includes a first adjustment circuit 222, a second adjustment circuit 224 and an adding circuit 226. The first adjustment circuit 222, coupled to the band-edge filtering circuit 210, adjusts the signal edge low-frequency error component in the signal filtered by the band-edge filtering circuit 210 to output a low-frequency adjusted signal. The second adjustment circuit 224, coupled to the band-edge filtering circuit 210, adjusts the signal edge high-frequency error component in the filtered signal to output a high-frequency adjusted signal. The adding circuit 226, coupled to the first adjustment circuit 222 and the second adjustment circuit 224, adds up the low-frequency adjusted signal and the high-frequency adjusted signal to generate the adjusted signal. As the gain control circuit 220 respectively adjusts the low-frequency error component and the high-frequency error component such that the power levels of the two error components are the same or have a fixed ratio, the timing error detector 130 is enabled to detect errors more accurately.

Figure 3:
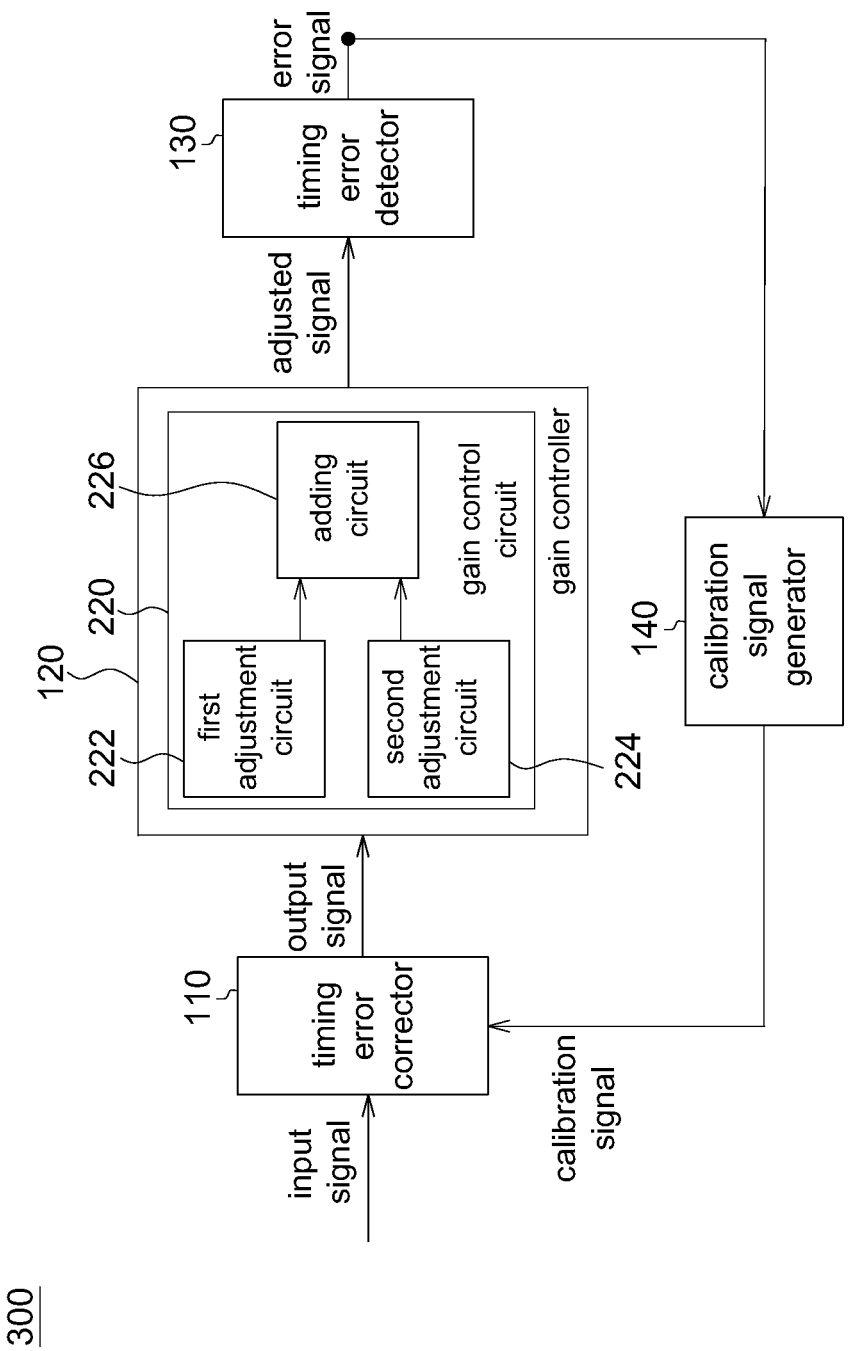
FIG. 3 is a schematic diagram of a gain controller in FIG. 1 according to another embodiment of the present invention.

FIG. 3 shows a schematic diagram of the gain controller 120 in FIG. 1 according to another embodiment of the present invention. A main difference of FIG. 3 from FIG. 2 is that, the embodiment in FIG. 3 does not include the band-edge filtering circuit 210, and directly adjusts the signal edge low-frequency and high-frequency error components according to the output signal from the timing error corrector 110. In other words, the gain control circuit 220 itself is capable of identifying the signal edge lower-frequency and high-frequency error components and performing the adjustment. More specifically, the first adjustment circuit 222 in FIG. 3 at this point is for adjusting the signal edge low-frequency error component in the output signal from the timing error corrector 110, and outputting a low-frequency adjusted signal accordingly. The second adjustment circuit 224 is for adjusting the signal edge high-frequency error component in the output signal and accordingly outputting a high-frequency adjusted signal.

Figure 4:
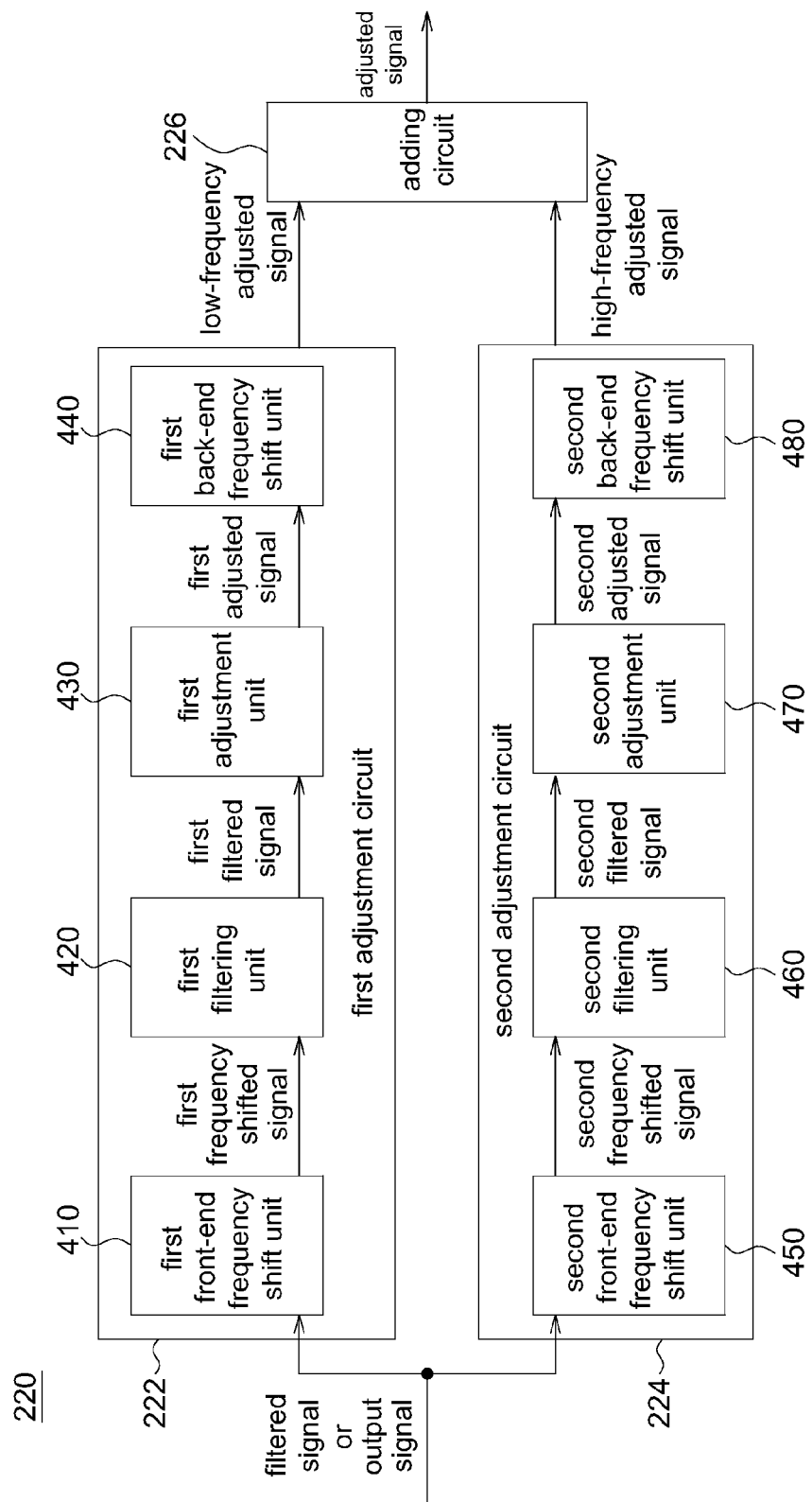
FIG. 4 is a schematic diagram of a gain control circuit in FIGS. 2 and 3 according to an embodiment of the present invention.
Figure 5A:
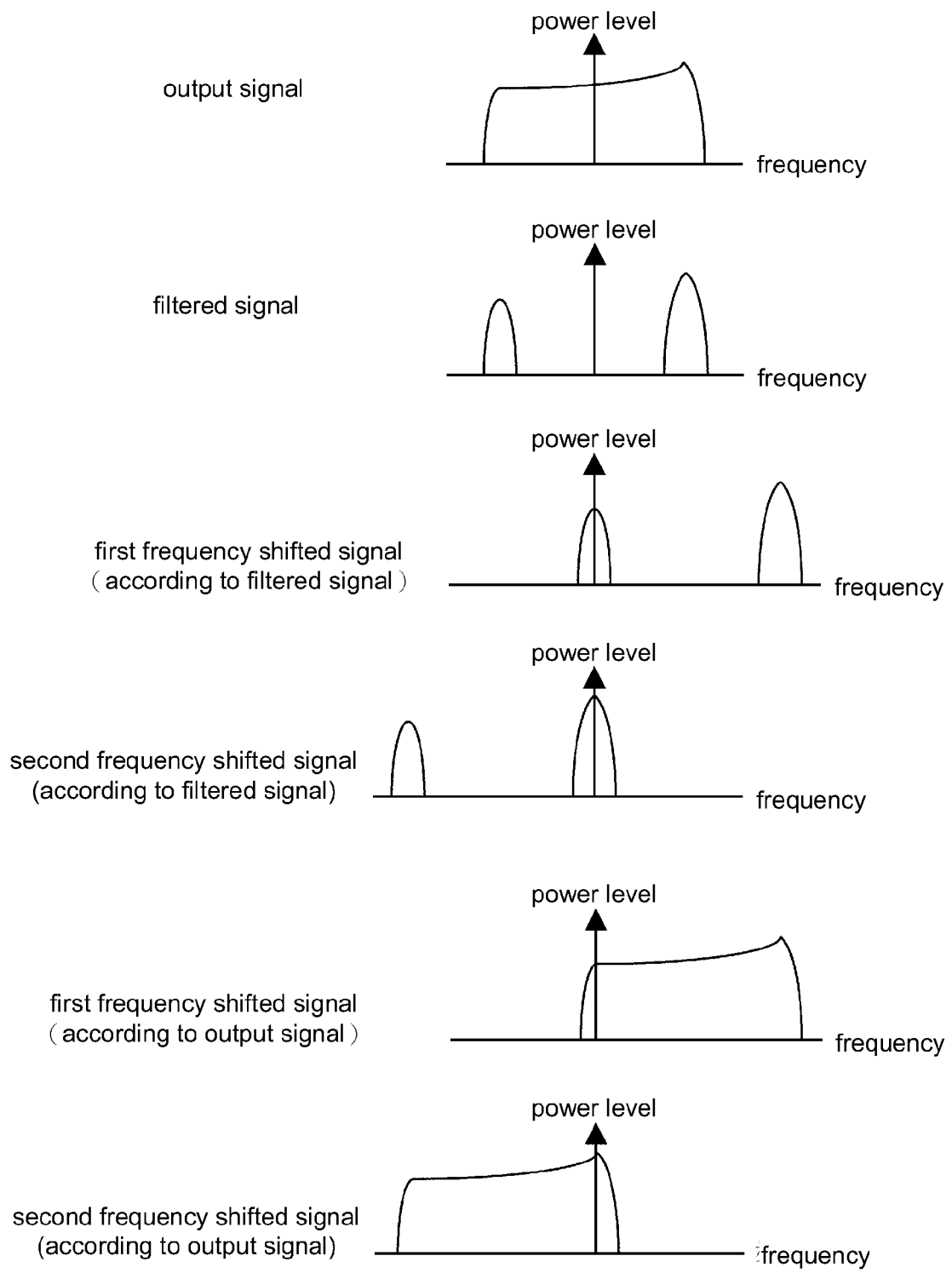
FIGS. 5a to 5c are schematic diagrams of waveforms of signals in FIGS. 2 to 4.
Figure 5B:
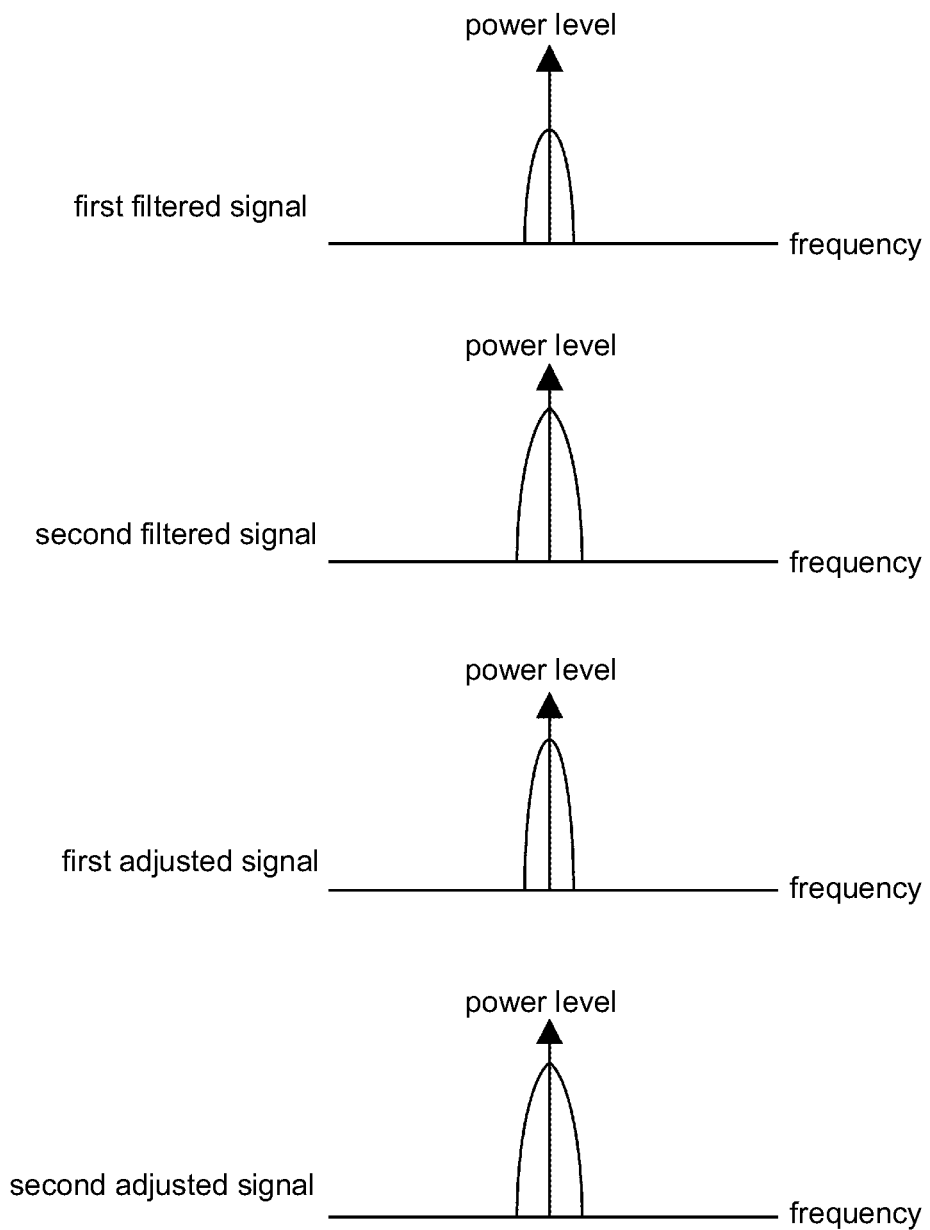
Figure 5C:
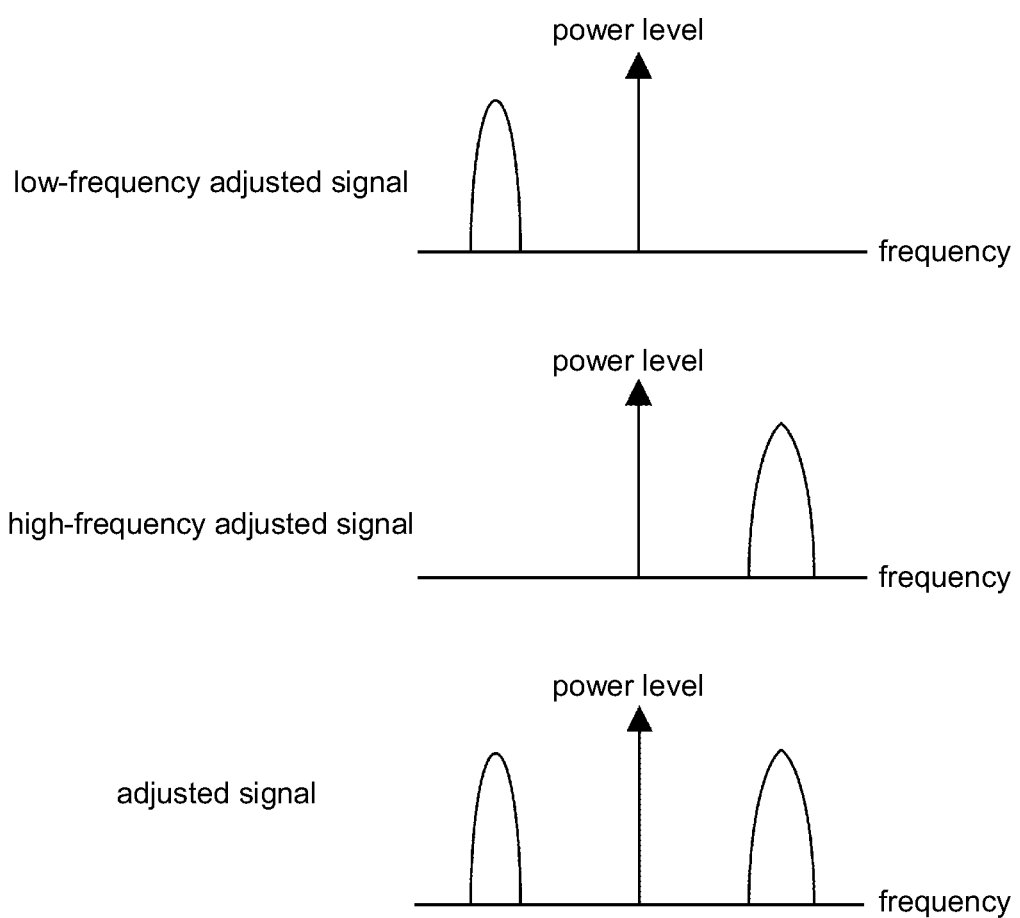

FIG. 4 shows a schematic diagram of the gain control circuit 220 in FIGS. 2 and 3 according to an embodiment of the present invention. FIGS. 5a to 5c show schematic diagrams of waveforms of signals in FIGS. 2 to 4. As shown in FIG. 4, the first adjustment circuit 222 of the gain control circuit 220 includes a first front-end frequency shift unit 410, a first filtering unit 420, a first adjustment unit 430, and a first back-end frequency shift unit 440. The first front-end frequency shift unit 410, coupled to the band-edge filtering circuit 210 or the timing error corrector 110, generates a first frequency shifted signal according to the filtered signal from the band-edge filtering circuit 210 or the output signal from the timing error corrector 110. In the embodiment, the first front-end frequency shift unit 410 shifts a center frequency of the signal edge low-frequency error component in the filtered signal or the output signal to a position with a frequency of zero to generate the first frequency shifted signal. The first filtering unit 420, coupled to the first front-end frequency shift unit 410, generates a first filtered signal according to the first frequency shifted signal. More specifically, the first filtering unit 420 keeps the signal edge low-frequency error component, and filters out the signal edge high-frequency error component or signal components other than the signal edge low-frequency error component. The first adjustment unit 430, coupled to the first filtering unit 420, generates a first adjusted signal according to the first filtered signal. In the embodiment, the first adjustment unit 430 adjusts the power level of the first filtered signal to a first predetermined power level to generate the first adjusted signal. The first back-end frequency shift unit 440, coupled to the first adjustment unit 430, generates the low-frequency adjusted signal according to the first adjusted signal. In the embodiment, the first back-end frequency shift unit 440 shifts a center frequency of the first adjusted signal to a position of an original center frequency of the signal edge low-frequency error component to generate the low-frequency adjusted signal.

Referring to FIG. 4, the second adjustment circuit 224 of the gain control circuit 220 includes a second front-end frequency shift unit 450, a second filtering unit 460, a second adjustment unit 470 and a second back-end frequency shift unit 480. The second front-end frequency shift unit 450, coupled to the band-edge filtering circuit 210 or the timing error corrector 110, generates a second frequency shifted signal according to the filtered signal from the band-edge filtering circuit 210 or the output signal from the timing error corrector 110. In the embodiment, the second front-end frequency shift unit 450 shifts a center frequency of the signal edge high-frequency error component in the filtered signal or the output signal to a position with a frequency of zero to generate a second frequency shifted signal. The second filtering unit 460, coupled to the second front-end frequency shift unit 450, generates a second filtered signal according to the second frequency shifted signal. More specifically, the second filtering unit 460 keeps the signal edge high-frequency error component, and filters out the signal edge low-frequency error component or signal components other than the high-frequency error component. The second adjustment unit 470, coupled to the second filter unit 460, generates a second adjusted signal according to the second filtered signal. In the embodiment, the second adjustment unit 470 adjusts the power level of the second filtered signal to a second predetermined power level to generate the second adjusted signal. The second predetermined power level is equal to the first predetermined power level, or is in a fixed ratio to the first predetermined power level. The second back-end frequency shift unit 480, coupled to the second adjustment unit 470, generates the high-frequency adjusted signal according to the second adjusted signal. In the embodiment, the second back-end frequency shift unit 480 shifts a center frequency of the second adjusted signal to a position of an original center frequency of the signal edge high-frequency error component to generate the high-frequency adjusted signal.

It should be noted that, according to the above disclosure, the power levels of the high-frequency adjusted signal and the low-frequency adjusted signal are equal or are in a fixed ratio.

Figure 6:
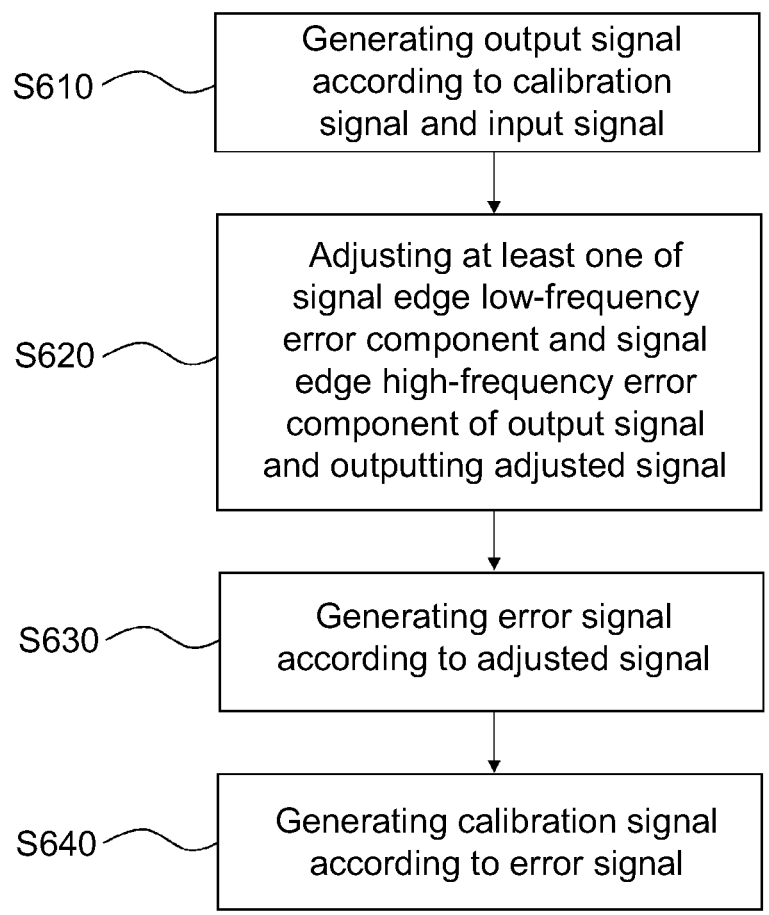
FIG. 6 is a flowchart of a timing recovery method according to an embodiment of the present invention.

In addition to the timing recovery apparatus disclosed in the above embodiments, the present invention further discloses a timing recovery method for compensating a sampling frequency offset of an input signal. The timing recovery method may be performed by the timing recovery apparatus of the present invention, or by other apparatuses capable of performing the method. Referring to FIG. 6, a timing recovery method according to an embodiment of the present invention includes the following steps.

In step S610, an output signal is generated according to a calibration signal and an input signal. Step S610 may be performed by an interpolation circuit. More specifically, in step S610, a plurality of sample values of the input signal may be selectively interpolated according to the calibration signal to generate the output signal.

In step S620, at least one of a signal edge low-frequency error component and a signal edge high-frequency error component of the output signal is adjusted, and an adjusted signal is accordingly outputted. Further, in step S620, a power level of the signal edge low-frequency error component and/or the signal edge high-frequency error component is adjusted, so that the power level of the low-frequency and/or high-frequency error component(s) equals one of a plurality of predetermined power levels, in a way that the power levels of the two error components are the same or have a fixed ratio. An adjusted signal containing the two error components is then outputted.

In step S630, an error signal is generated according to the adjusted signal. A Gardner algorithm may be adopted in step S630 to calculate the adjusted signal and generate the error signal. The Gardner algorithm is previously described and is a known prior art, and description thereof shall be omitted herein.

In step S640, the calibration signal is generated according to the error signal, so that step S610 may compensate the sampling frequency offset by selectively using the input signal according to the calibration signal. Step S640 may be performed by a filter, and the error signal is processed according to a predetermined rule to generate the calibration signal. Without affecting possible implementation of the present invention, the predetermined rule is an averaging calculation, a weighted averaging calculation or another known calculation on the error signal received within a period of time.

Referring to FIG. 6 as well as description associated with FIG. 2, according to an embodiment, step S620 includes: obtaining the signal edge low-frequency error component and the signal edge high-frequency error component from the output signal to generate a filtered signal (step S622, not shown); adjusting the signal edge low-frequency error component according to the filtered signal, and accordingly outputting a low-frequency adjusted signal (step S624, not shown); adjusting the signal edge high-frequency error component according to the filtered signal, and accordingly outputting a high-frequency adjusted signal (step S626, not shown); and adding up the low-frequency and high-frequency adjusted signals to generate the adjusted signal (step S628, not shown). Referring to FIG. 6 as well as description associated with FIG. 3, according to another embodiment, step S620 includes: adjusting the signal edge low-frequency error component according to the output signal, and accordingly outputting a low-frequency adjusted signal (step S625, not shown); adjusting the signal edge high-frequency error component according to the output signal, and accordingly outputting a high-frequency adjusted signal (step S627, not shown); and adding up the low-frequency and high-frequency adjusted signals to generate the adjusted signal (step S628, not shown). Referring to FIGS. 4, 5a to 5c, step S624 or S625 may include: generating a first frequency shifted signal according to the filtered signal or the output signal; generating a first filtered signal according to the first frequency shifted signal, wherein the first filtered signal includes the signal edge low-frequency error component; generating a first adjusted signal according to the first filtered signal; and generating the low-frequency adjusted signal according to the first adjusted signal. Further, referring to FIGS. 4, 5a and 5b, similarly, step S626 or S627 may include: generating a second frequency shifted signal according to the filtered signal or the output signal; generating a second filtered signal according to the second frequency shifted signal, wherein the second filtered signal includes the signal edge high-frequency error component; generating a second adjusted signal according to the second filtered signal; and generating the high-frequency adjusted signal according to the second adjusted signal.

It should be noted that, the timing recovery method in FIG. 6 can be thoroughly understood with reference to the description associated with FIGS. 1 to 5c, and such details are omitted herein.

The timing recovery apparatus and associated method may be a non-data-aided apparatus and a non-data-aided method. More specifically, the apparatus and associated method of the present invention are capable of performing timing error detection without involving the pilot signal or training sequence, although the present invention may also include the approach of performing timing error detection by adopting the pilot signal or training sequence.

In conclusion, in the present invention, by separately adjusting the signal edge low-frequency error component and the signal edge high-frequency error component in the signal, the power levels of the two error components are rendered equal or have a fixed ratio, thereby preventing changes in the power levels from causing changes in the error signal generated by the timing error detector. In other words, a system employing the present invention is less sensitive to changes in a transmission channel or transmission environment, and can thus maintain stability.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A timing recovery apparatus, for compensating a sampling frequency offset of an input signal, comprising:
    a timing error corrector, for generating an output signal according to a calibration signal and the input signal;
    a gain controller, receiving said output signal and configured to adjust at least one of a signal edge low-frequency error component and a signal edge high-frequency error component of the output signal, and accordingly output an adjusted signal;
    a timing error detector, receiving said adjusted signal and configured to generate an error signal according to the adjusted signal; and
    a calibration signal generator, coupled to the timing error detector and the timing error corrector, receiving said error signal and generating the calibration signal according to the error signal, and outputting the calibration signal to the timing error corrector to compensate the sampling frequency offset.

2. The timing recovery apparatus according to claim 1, wherein the gain controller renders power levels of the signal edge low-frequency error component and the signal edge high-frequency error component to be in a fixed ratio.

3. The timing recovery apparatus according to claim 1, wherein the gain controller adjusts power levels of the signal edge low-frequency error component and the signal edge high-frequency error component to a first predetermined power level and a second predetermined power level, respectively.

4. The timing recovery apparatus according to claim 1, wherein the gain controller comprises a gain control circuit, and the gain control circuit comprises:
- a first adjustment circuit, configured to adjust the signal edge low-frequency error component, and accordingly output a low-frequency adjusted signal;
- a second adjustment circuit, configured to adjust the signal edge high-frequency error component, and accordingly output a high-frequency adjusted signal; and
- an adding circuit, configured to add up the low-frequency and high-frequency adjusted signals to generate the adjusted signal.

5. The timing recovery apparatus according to claim 4, further comprising:
- a band-edge filtering circuit, configured to obtain the signal edge low-frequency error component and the signal edge high-frequency error component from the output signal.

6. The timing recovery apparatus according to claim 5, wherein the first adjustment circuit comprises:
- a first front-end frequency shift unit, configured to generate a first frequency shifted signal according to the signal edge low-frequency error component;
- a first filtering unit, configured to generate a first filtered signal according to the first frequency shifted signal, wherein the first filtered signal comprises the signal edge low-frequency error component;
- a first adjustment unit, configured to generate a first adjusted signal according to the first filtered signal; and
- a first back-end frequency shift unit, configured to generate the low-frequency adjusted signal according to the first adjusted signal; and the second adjustment circuit comprises:
- a second front-end frequency shift unit, configured to generate a second frequency shifted signal according to the signal edge high-frequency error component;
- a second filtering unit, configured to generate a second filtered signal according to the second frequency shifted signal, wherein the second filtered signal comprises the signal edge high-frequency error component;
- a second adjustment unit, configured to generate a second adjusted signal according to the second filtered signal; and
- a second back-end frequency shift unit, configured to generate the high-frequency adjusted signal according to the second adjusted signal.

7. The timing recovery apparatus according to claim 4, wherein the first adjustment circuit comprises:
- a first front-end frequency shift unit, configured to generate a first frequency shifted signal according to the output signal;
- a first filtering unit, configured to generate a first filtered signal according to the first frequency shifted signal, wherein the first filtered signal comprises the signal edge low-frequency error component;
- a first adjustment unit, configured to generate a first adjusted signal according to the first filtered signal; and
- a first back-end frequency shift unit, configured to generate the low-frequency adjusted signal according to the first adjusted signal; and the second adjustment circuit comprises:
- a second front-end frequency shift unit, configured to generate a second frequency shifted signal according to the output signal;
- a second filtering unit, configured to generate a second filtered signal according to the second frequency shifted signal, wherein the second filtered signal comprises the signal edge high-frequency error component;
- a second adjustment unit, configured to generate a second adjusted signal according to the second filtered signal; and
- a second back-end frequency shift unit, configured to generate the high-frequency adjusted signal according to the second adjusted signal.

8. The timing recovery apparatus according to claim 1, wherein the timing error corrector comprises an interpolation circuit for interpolating the input signal according to the calibration signal to generate the output signal.

9. The timing recovery apparatus according to claim 1, wherein the timing error detector utilizes a Gardner algorithm to generate the error signal according to the adjusted signal.

10. The timing recovery apparatus according to claim 1, wherein the calibration signal generator calculates an average value of the error signal within a period of time to generate the calibration signal.

11. A timing recovery method, for compensating a sampling frequency offset of an input signal, comprising:
- generating an output signal according to a calibration signal and the input signal;
- adjusting at least one of a signal edge low-frequency error component and a signal edge high-frequency error component of the output signal, and accordingly outputting an adjusted signal;
- generating an error signal according to the adjusted signal; and
- generating the calibration signal according to the error signal, wherein the calibration signal is for compensating the sampling frequency offset.

12. The timing recovery method according to claim 11, wherein the step of adjusting the signal edge low-frequency error component and the signal edge high-frequency error component comprises:
- rendering power levels of the signal edge low-frequency error component and the signal edge high-frequency error component to be in a fixed ratio.

13. The timing recovery method according to claim 11, wherein the step of adjusting the signal edge low-frequency error component and the signal edge high-frequency error component comprises:
- adjusting power levels of the signal edge low-frequency error component and the signal edge high-frequency error component to a first predetermined power level and a second predetermined power level, respectively.

14. The timing recovery method according to claim 11, wherein the step of adjusting the signal edge low-frequency error component and the signal edge high-frequency error component comprises:
- adjusting the signal edge low-frequency error component, and accordingly outputting a low-frequency adjusted signal;
- adjusting the signal edge high-frequency error component, and accordingly outputting a high-frequency adjusted signal; and
- adding up the low-frequency and high-frequency adjusted signals to generate the adjusted signal.

15. The timing recovery method according to claim 14, further comprising:

obtaining the signal edge low-frequency error component and the signal edge high-frequency error component from the output signal.

16. The timing recovery method according to claim 15, wherein the step of adjusting the signal edge low-frequency error component comprises:
    generating a first frequency shifted signal by frequency shifting the signal edge low-frequency error component;
    generating a first filtered signal by filtering the first frequency shifted signal, wherein the first filtered signal comprises the signal edge low-frequency error component;
    generating a first adjusted signal by adjusting the first filtered signal; and
    generating the low-frequency adjusted signal by frequency shifting the first adjusted signal; and
    the step of adjusting the signal edge high-frequency error component comprises:
    generating a second frequency shifted signal by frequency shifting the signal edge high-frequency error component;
    generating a second filtered signal by filtering the second frequency shifted signal, wherein the second filtered signal comprises the signal edge high-frequency error component;
    generating a second adjusted signal by adjusting the second filtered signal; and
    generating the high-frequency adjusted signal by frequency shifting the second adjusted signal.

17. The timing recovery method according to claim 14, wherein the step of adjusting the signal edge low-frequency error component comprises:
    generating a first frequency shift signal by frequency shifting the output signal;
    generating a first filtered signal by filtering the first frequency shifted signal, wherein the first filtered signal comprises the signal edge low-frequency error component;
    generating a first adjusted signal by adjusting the first filtered signal; and
    generating the low-frequency adjusted signal by frequency shifting the first adjusted signal; and
    the step of adjusting the signal edge high-frequency error component comprises:
    generating a second frequency shift signal by frequency shifting the output signal;
    generating a second filtered signal by filtering the second frequency shifted signal, wherein the second filtered signal comprises the signal edge high-frequency error component;
    generating a second adjusted signal by adjusting the second filtered signal; and
    generating the high-frequency adjusted signal by frequency shifting the second adjusted signal.

18. The timing recovery method according to claim 11, wherein the step of generating the output signal according to the calibration signal and the input signal comprises:
    interpolating the input signal according to the calibration signal to generate the output signal.

19. The timing recovery method according to claim 11, wherein the step of generating the error signal according to the adjusted signal comprises:
    utilizing a Gardner algorithm to generate the error signal according to the adjusted signal.

20. The timing recovery method according to claim 11, wherein the step of generating the calibration signal according to the error signal comprises:
    calculating an average value of the error signal within a period of time to generate the calibration signal.

* * * * *